US006581758B1

(12) United States Patent
van-Zijderveld et al.

(10) Patent No.: US 6,581,758 B1
(45) Date of Patent: Jun. 24, 2003

(54) CONVEYOR MAT (75) Inventors: George Johannes van-Zijderveld, 's-Gravenzande (NL); Franciscus Josephus Maria van Esch, Breda (NL)

(73) Assignee: MCC Nederland, Gravenzande (NL)

( * ) Notice: Subject to any disclaimer, the term of this patent is extended or adjusted under 35 U.S.C. 154(b) by 0 days.

(21) Appl. No.: 09/647,435
(22) PCT Filed: Mar. 30, 1999
(86) PCT No.: PCT/NL99/00183
§ 371 (c)(1), (2), (4) Date: Oct. 2, 2000
(87) PCT Pub. No.: WO99/50160
PCT Pub. Date: Oct. 7, 1999

Related U.S. Application Data
(60) Provisional application No. 60/079,962, filed on Mar. 30, 1998.

(30) Foreign Application Priority Data

Mar. 30, 1998 (NL) ............................................. 1008743

(51) Int. Cl.[7] .............................................. B65G 17/06
(52) U.S. Cl. ....................................... 198/853; 198/850
(58) Field of Search ................................. 198/850, 853, 198/778

(56) References Cited

U.S. PATENT DOCUMENTS 5,224,583 A * 7/1993 Palmaer et al. ......... 198/853 X
5,573,106 A * 11/1996 Stebnicki ................ 198/850 X
5,816,390 A * 10/1998 Stebnicki .................... 198/853

* cited by examiner

Primary Examiner—James R. Bidwell
(74) Attorney, Agent, or Firm—Varnum, Riddering, Schmidt & Howlett LLP (57) ABSTRACT A conveyor mat comprises a number of plastic modules succeeding each other in a conveying direction and whose top sides form a conveying face and provided with converging hinge loops which have equal basic forms and which alternately extend forwards and rearwards relative to the conveying direction and successive modules are coupled by means of hinge pins, such that the forwardly extending hinge loops of the rearmost module can slide between the rearwardly extending hinge loops of the next module between a slide-out position and a slide-in position, a sidewall of a forwardly extending hinge loop is provided with a projection which in the slide-out position cooperates with the top of the adjacent, rearwardly extending hinge loop, and the sidewall of the adjacent hinge loop is provided with a recess in which the projection can be received during sliding into the slide-in position.

13 Claims, 6 Drawing Sheets

CONVEYOR MAT

This application claims benefit of provisional appln 60/079,962 filed Mar. 30, 1998.

The invention relates to a conveyor mat comprising number of plastic modules succeeding each other in a conveying direction and whose top sides form a conveying face, said modules each being provided, in a transverse direction thereof, with a number of hinge loops which have equal basic forms and which alternately extend forwards and rearwards relative to the conveying direction and converge from a base to a top, said hinge loops being provided, adjacent the top thereof, with slotted holes, said modules each being further provided with a number of interspaces formed to be at least partially complementary to the hinge loops and at least partially bounded by the sidewalls of two hinge loops extending in the same direction, the successive modules of said conveyor mat being coupled by means of hinge pins extending through the slotted holes, such that the forwardly extending hinge loops of the rearmost module can slide between the rearwardly extending hinge loops of the next module between a slit-out position in which the hinge pins abuts against a top-proximal wall of the slotted hole and a slid-in position.

It is observed that whenever the conveying direction is mentioned in this context, the direction is meant in which a particular module can travel along a conveying path. It is further observed that the module can move along the conveying path in two opposite conveying directions and that, accordingly, the terms 'forwards' and 'rearwards' depend on the conveying direction chosen.

Such conveyor mat is known from practice and is referred to as 'bend mat'. By sliding the hinge loops in and out, the conveying path followed by the modules of the conveyor mat can make a bend in the conveying plane, such as a bend in the conveying track.

For assembling a conveyor mat, a smallest possible minimal radius R of a bend lying in the conveying plane is aimed at. For a conveyor mat of a given width, the minimal radius R is less according as the hinge loops can slide relative to each other through a larger distance. The distance through which the hinge loops can slide relative to each other may be larger according as the pitch of the modules in conveying direction is chosen to be greater, i.e. according as the modules in conveying direction are of longer design. However, in view of the conveyor mat deforming into a polygon, a greater pitch increases the minimal radius R of a bend that can be made by the conveyor mat in a plane perpendicular to the conveying plane and extending in conveying direction. Such a bend is made when the mat travels around a return wheel at an end face of a conveyor mat extending along an endless path. Preferably, the radius R is as small as possible, to enable the end face of such endless conveyor mat to be placed as close as possible against a following conveying member.

The above conditions have together resulted in a band mat of the type as set forth in the preamble, wherein a maximal slide-in distance is realized at a minimal pitch.

A drawback of the known conveyor mat is that the successive modules in their slid-out position can slide relative modules in their slid-out position can slide relative to each other transversely to the conveying direction. This involves the chance of the conveyor mat sliding away transversely to the conveying path and/or the longitudinal axes of a number of modules not being perpendicular to the conveying direction. This may cause increased wear of and damage to the conveyor mat. Moreover, the conveyor mat may become damaged when the hinge pins, during travel around a return wheel, do not extend transversely to the conveying direction.

In addition, WO-A 95/28343 discloses a "bend" or "radius" type conveyor mat according the preamble of claim 1, having a projection/recess assembly for blocking lateral movement of the modules in slid-out position. In particular, the forwardly extending hinge loops are provided, between the base thereof and the top-proximal wall of the slotted hole, with a projection in the form of an alignment tab which, in the slid-out position, cooperates with the top of the adjacent, rearwardly extending hinge loop. The side wall of the adjacent hinge loop is provided with a recess, formed as a slot, in which the alignment tab is received during sliding into the slid-in position.

WO-A 91/01261 describes a "bend" or "radius" type conveyor mat having the basic lay out of the mat disclosed in WO-A 95/28343. In slid-out position, however, the protrusions of the blocking mechanism cooperate with additional protrusions located near the tops of the rearwardly extending hinge loops.

A problem associated with the alignment tab/slot assembly of WO-A 95/28343 or WO-A 91/01261 is that, when the conveying face is to travel through a bend perpendicular to the conveying plane, e.g. when the mat is to travel around a return wheel, the modules must be in the slid-out position. When travelling through such a perpendicular bend in the slid-in position, the guide tab extends into the slot and will block bending out of the plane of travel. This may lead to breakage of the guide tab or damage to the material surrounding the slot.

Starting from WO-A 95/28343, the objective technical problem is to provide a projection/recess assembly for blocking lateral movement of the modules in the slid-out position, which allows the modules to bend out of the plane of travel when they are in or near the slid-in position.

The object of the invention is to provide a conveyor mat wherein the above drawbacks are avoided while the advantages are retained.

To that end, the conveyor mat according to the invention is characterized by the feature of claim 1.

At least one sidewall of at least one forwardly extending hinge loop is provided, between the base thereof and the top-proximal wall of the slotted hole, with a projection which in said slid-out position cooperates with the top of the adjacent, rearwardly extending hinge loop, and that the sidewall of the adjacent hinge loop is provided with a recess in which the projection can be received during sliding into the slid-in position.

The effect thus achieved is that in said slid-out position, the projection, through cooperation with the top, considerably impedes displacement in transverse direction, while a maximal slide-in direction is maintained.

By constructing the hinge loops at the location of the recesses in the side walls and the projections free of overlapping parts in at least the slid-in position, it is possible for conveyor mat to travel through a bend perpendicular to the conveying plane in or near the slid-in position, without the risk of damage occurring to the projections of the recesses.

The projection and the corresponding recess in the sidewall of successive modules are designed so that between the projection and the sidewall, in a direction substantially transverse to the conveying plane, sufficient space of movement is present for enabling the successive modules to move, from slid-in position and from the conveying face, through a bend in a plane transverse to the conveying face and extending in conveying direction, without damage being caused to the projection and/or the sidewall adjacent the recess. It is thus provided that the occurrence of damage can be avoided when successive modules, when they travel around a divert wheel from the conveying face, are not in the slid-out position, for instance due to the fact that the longitudinal axes of the successive modules do not extend entirely parallel, or that the successive modules are stuck or clamped in slid-in position.

The projection and the sidewall at the location of the recess, viewed in a direction transverse to the conveying face, are free of any overlapping parts and/or the projection and the sidewall at the location of the recess lie substantially next to each other. It is thus provided that in a simple manner, a relative movement in two directions transverse to the conveying face is enabled and that the chance of fouling of the projection and/or the recess is reduced. In particular the recess is formed by one or more guide faces extending substantially transversely to the conveying face, from the bottom side to the top side of the hinge loop.

In a next embodiment, both sidewalls of a forwardly extending hinge loop are provided with a projection between the base and the top-proximal wall of the slotted hole, and the sidewalls of the opposite, rearwardly extending hinge loops are each provided, adjacent the top thereof, with a corresponding recess.

Accordingly, in said slid-out position, displacement in transverse direction is further obstructed.

In another embodiment, the conveyor mat according to the invention is characterized in that the hinge loops located in a part located adjacent a lateral side of the conveyor mat comprise substantially flat sidewalls. It is thus provided that the minimal section of the hinge loops which, when traveling around a bend in the horizontal plane, are subjected to a heavier load, is greater, while the hinge loops located more at the center the conveyor mat and which are subjected to a less heavy load, obstruct the displacement in transverse direction.

In again another embodiment, the conveyor mat according to the invention is characterized in that the hinge loops bounding a lateral side of the conveyor mat have, in transverse direction of the module, a greater width than the other hinge loops. It is thus provided that the tolerance of the length of the hinge pins can chosen to be greater.

In yet another embodiment, the conveyor mat according to the invention is characterized in that at least a part of the hinge loops bounding a lateral side of the conveyor mat are provided, adjacent their top, with a recess that extends substantially transversely to the conveying direction and that intersects the slotted hole. It can thus be provided that in the recess, a locking member can be received for retaining the hinge pin that is inserted from the conveying face.

The locking member can be elegantly provided with preferably spring-loaded, laterally extending parts which, in mounted condition, can extend into the slotted hole. Further, the locking member may comprise an edge which, in mounted condition of the locking member, is accessible from the lateral side of the conveyor mat via the slotted hole. In this manner, the locking member can readily be removed from the recess by means of a screwdriver. It is observed that the locking member can also be advantageously applied to other types of modular conveyor mats.

In a following embodiment, the conveyor mat according to the invention is characterized in that a number of modules are each provided, at the bottom side thereof, with an outwardly extending guide member for cooperation with a guide mounted on a conveying path, which guide member has a lateral side thereof provided with a face beveled transversely to the conveying direction. In this manner, displacement in transverse direction is further obstructed, while at the same time, the conveyor mat is prevented from rising when traveling through a bend in the conveying plane.

Further, the face of the guide members that is foremost and/or rearmost in conveying direction is preferably provided with a bevel extending in rearward or forward direction respectively. It is thus provided that the guide members can project sufficiently far outwards without increasing the minimal radius R of a bend that can be made by the conveyor mat in a plane perpendicular to the conveying face the extending in conveying direction. It is observed that such guide members can also be advantageously applied to other types of modular conveyor mats.

Further elaborations of advantageous embodiments of the conveyor mat according to the invention are described in the subclaims.

The invention will hereinafter be specified on the basis of an exemplary embodiment of a conveyor mat according to the invention, with reference to the accompanying drawings. In these drawings.

It is observed that the Figures are only schematic representations of a preferred embodiment of the invention. In the Figures, identical or like parts are denoted by corresponding reference numerals.

Figure 1:
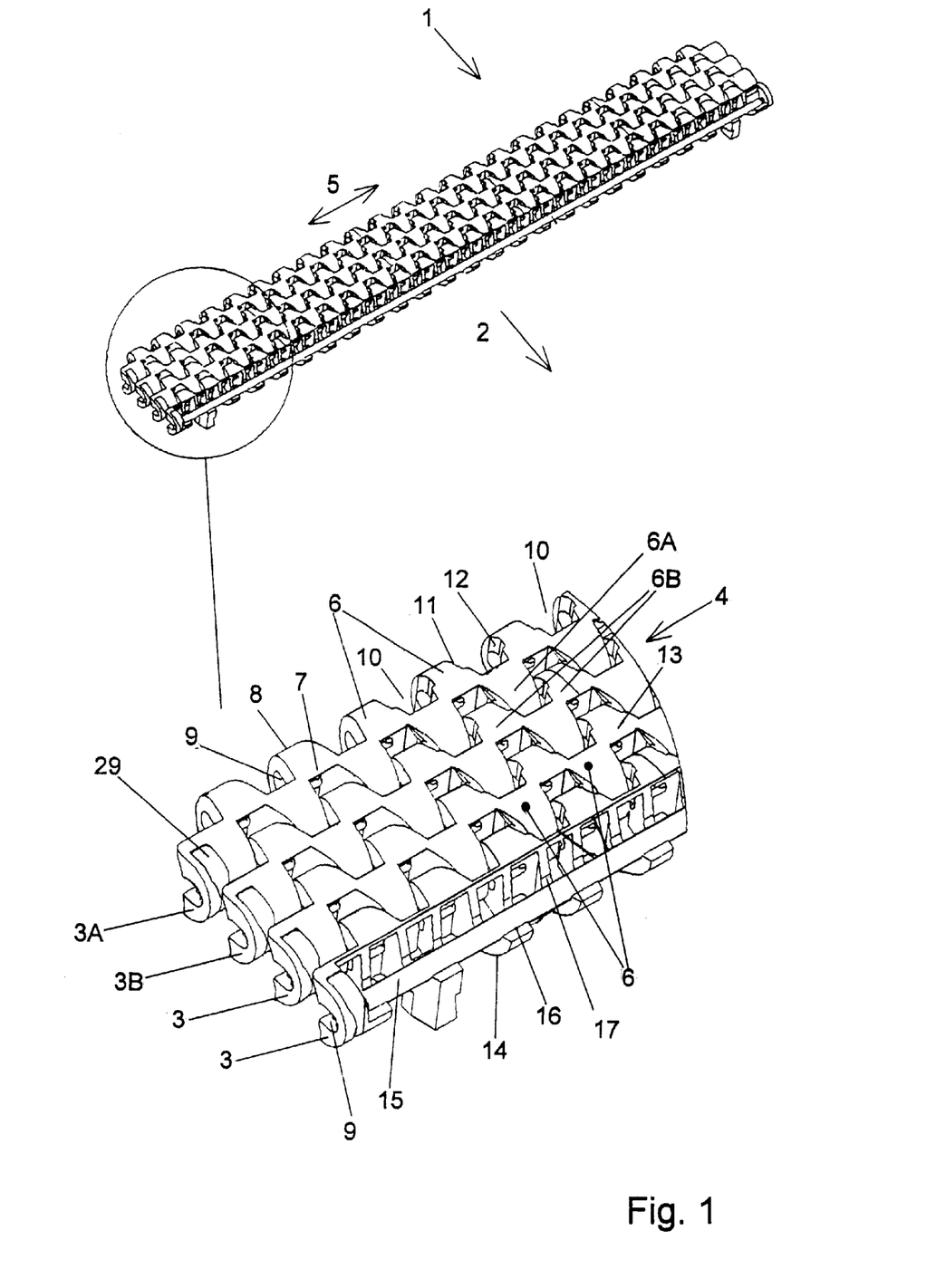
FIG. 1 is a schematic perspective view of a part of the conveyor mat.

FIG. 1 shows a part of a conveyor mat 1 having a number of plastic modules 3 succeeding each other in a conveying direction 2 indicated by an arrow. The top sides 13 of the modules 3 are closed and together constitute a conveying face 4. In a transverse direction 5 indicated by an arrow, the modules 3 each comprise hinge loops 6 which have identical basic forms and alternately extend forwards and rearwards relative to the conveying direction 5. In basic form, the hinge loops 6 are V-shaped and converge from a base 7 to a top 8. Adjacent the top 8, the hinge loops 6 are provided with a slotted hole 9. The base 7 of the hinge loops is bounded by the center M of the module. The center M of the module is formed by a face perpendicular to the conveying direction 2 and parallel to the transverse direction 5 and which, viewed in conveying direction 2, is located at midlength of the module.

Located between the hinge loops 6 are interspaces 10 which are formed to be substantially complementary to the hinge loops 6 and which are at least bounded by the sidewalls 11, 12 of two hinge loops 6 extending in the same direction.

The successive modules 3 are coupled by means of hinge pins 15 extending through the slotted holes 9, such that the forwardly extending hinge loops 6A of the rearmost module 3A are located between the rearwardly extending hinge loops 6B of the next module 3B. The hinge loops 6A can slide between a slid-out position I (FIG. 3) in which the hinge pin 15 abuts against a wall 16, proximal to the top 8, of the slotted hole 9, and a slid-in position II (FIG. 4). Preferably, in the slid-in position, the hinge pin 15 abuts against a wall 17 of the slotted hole 9 proximal to the base 17.

Due to the zigzag pattern of the base-adjoining hinge loops 6 with substantially equally shaped interspaces 10 therebetween, the successive modules 3A, 3B can slide in to a position beyond the center M and a maximal slide-in distance is realized.

Figure 2:
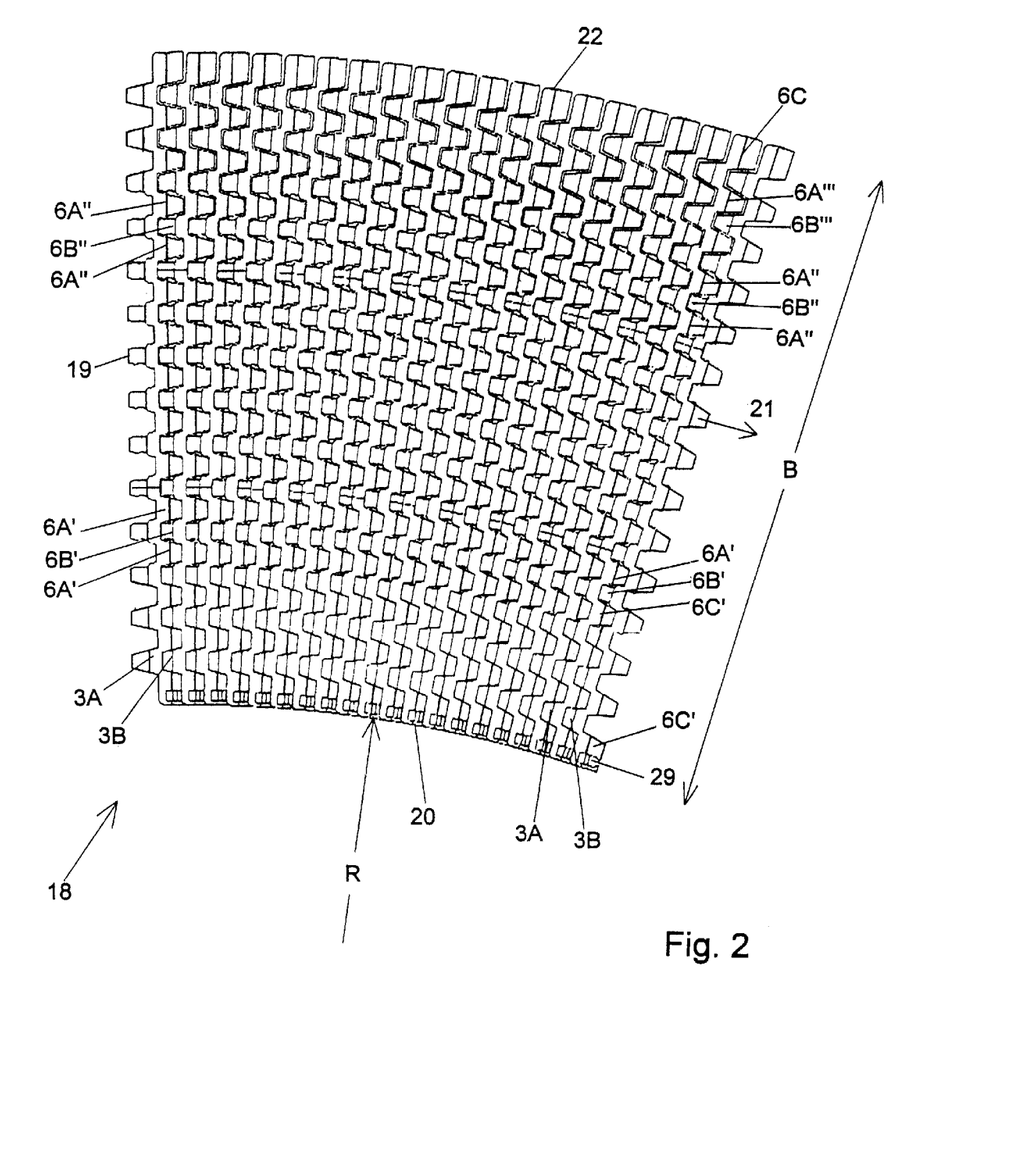
FIG. 2 is a schematic top plan view of a part of a conveyor mat in a bend lying in the conveying plane.

FIG. 2 is a top plan view of a part of a conveyor mat 1 lying in a bend 18 having radius R. Precisely before the part of the bend that is indicated by reference numeral 19, the hinge loops 6A', 6B' of two modules 3A, 3B succeeding each other in conveying direction 2, which hinge loops 6A', 6B' are located adjacent the inner bend 20, have slid into each other from the slid-out position I in the direction of the slid-in position II. Precisely after the part of the bend 18 that is indicated by reference numeral 21, the hinge loops 6A', 6B' located adjacent the inner bend 20 slide apart again, to reach the slid-out position I again.

During traveling around the bend 18, the hinge loops 6A", 6A" located adjacent the outer bend 22 virtually remain in the slid-out position I. The degree of sliding in depends on the width position of the hinge loop in the conveyor mat. As it is, viewed the width B of the conveyor mat 1, the degree of sliding in increases linearly from zero at the outer bend 22 to maximal at the inner bend 20.

Figure 3:
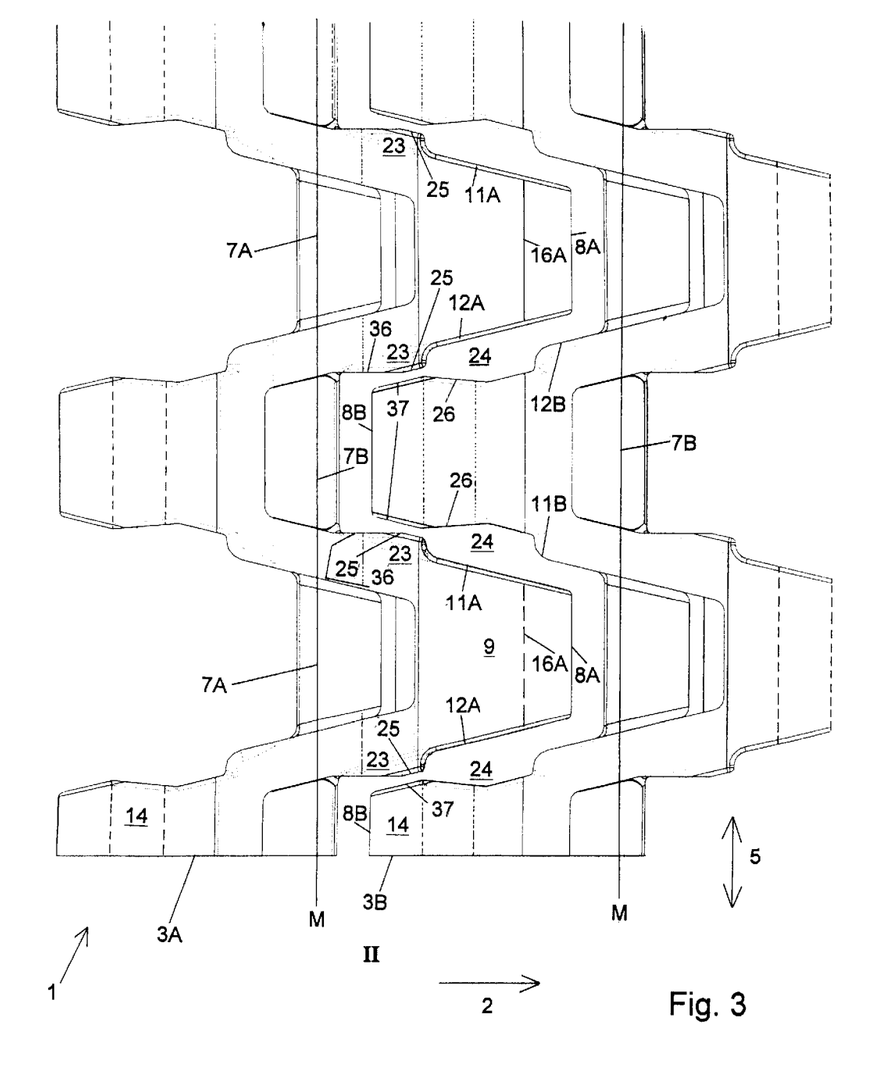
FIG. 3 is a schematic bottom view of two modules of the conveyor mat of FIG. 1 in slid-out position.
Figure 4:
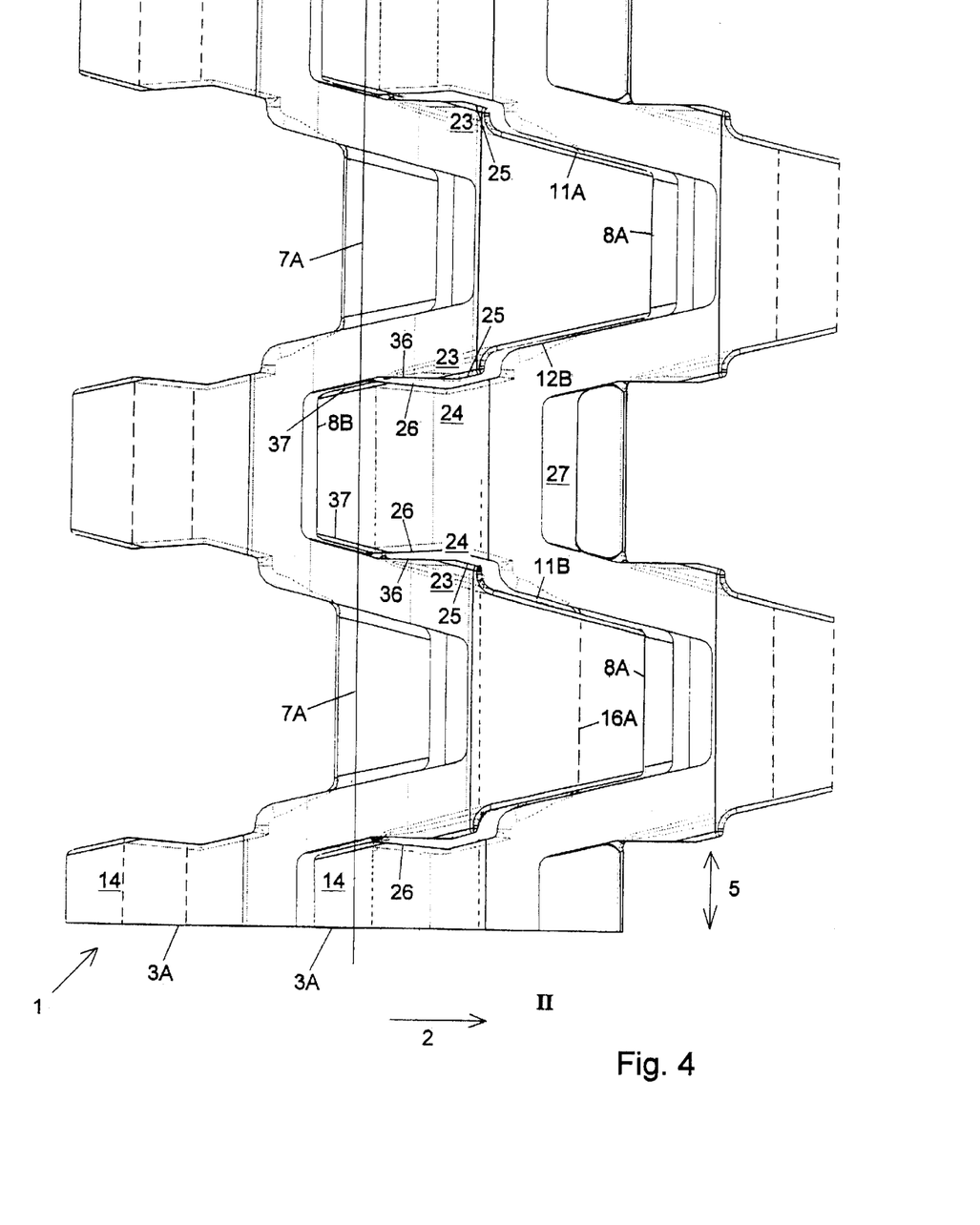
FIG. 4 is a schematic bottom view of the modules of FIG. 3 is slid-in position.

FIG. 3 shows a detail of the bottom side 14 of the conveyor mat 1. The sidewalls 11A, 12A of a forwardly extending hinge loop 6A are provided, between the base 7A thereof and the wall 16A of the slotted hole 9A which wall is proximal to the top 8A, with projections 23. In the slid-out position I shown, the projections 23 cooperate with the top 8B of the adjacent, rearwardly extending hinge loop 6B. Preferably, viewed in forward direction, the projections 23 are located between the center M of the module 3 and at midlength of the slotted hole 9.

Through cooperation of the projections 23 with the top 8B, the free space between the sidewalls 11A and 11B, respectively 12A and 12B, is reduced, whereby displacement in transverse direction 5 is impeded to a considerable extent. In an advantageous manner, the projections 23 are each provided with a contact face 25 for cooperation with corresponding faces 37 of the top 8B of the adjoining hinge loop 6B. Thus, the contact pressure is reduced and, moreover, the sliding movement is facilitated. The projections 23 extend transversely to the conveying face 4, preferably to a position just below the conveying face 4 (not shown). This realizes a proper operation and prevents a product from being touched by a projection 23 when the product travels around a divert wheel.

FIG. 4 shows the slid-in position II. The sidewalls 11B, 12B of the adjoining hinge loop 6B are each provided, adjacent the top 8B thereof, with a recess 24 in which a projection 23 is received. In an advantageous manner, the recesses 24 are each provided with a slide-in face 26 extending transversely to the conveying face 4, substantially parallel to the sidewall 11A respectively 12A of the opposite hinge loop 6A. It is observed that by this, it is meant that the face may also be directed slightly more towards the inside of the hinge loop in which the recess has been provided, as shown in the Figure. Through cooperation with corresponding faces 36 of the projections 23, the slide-in movement is facilitated.

Between the projections 23 and the recesses 24, in a direction substantially transverse to the conveying face, sufficient space for movement is present for the modules to travel, from slid-in position in the conveying face, through a bend in a plane transverse to the conveying plane and extending in conveying direction, without involving damage to the projections 23 and/or the recesses 24. It is observed that under conditions that otherwise remain the same, the required space for movement increases at a decreasing curvature radius of the bend to be followed. In the Figure, it is clearly shown that the hinge loops 63 at the location of the recesses 24 in the sidewalls 11B, 12B and the projections 23 are free of overlapping parts. At the location of the recess 24, the sidewalls 11B and 12B are substantially located adjacent the projections 23. The recesses in the sidewalls 11B, 12B are formed by closed guiding faces extending substantially transversely to the conveying face, from the bottom side of the hinge loop to the top side of the hinge loop. With this configuration of projections 23 and recesses 24, it is possible to make a bend from slid-in position II from the conveying face both upwards and downwards. Of course, these movements are also possible in reverse direction, i.e. traveling through a bend to the slid-in position.

Again referring to FIG. 2, it is shown therein that the hinge loops 6A''', 6B''', subjected to a heavier load in an outer bend and located in a part adjacent a lateral side of the conveyor mat, are provided with substantially flat sidewalls. In these hinge loops, the V-shaped basic form is maintained.

In transverse direction of the module, the hinge loops 6C bounding a lateral side of the conveyor mat have an even greater width. Adjacent the top 8C, the opposite hinge loops 6C' are provided with a recess 29 extending substantially transversely to the conveying direction and intersecting the slotted hole 9C. From the conveying face 4, a locking member 30 can be inserted into the recess 29 for retaining the hinge pin 15.

Figure 5:
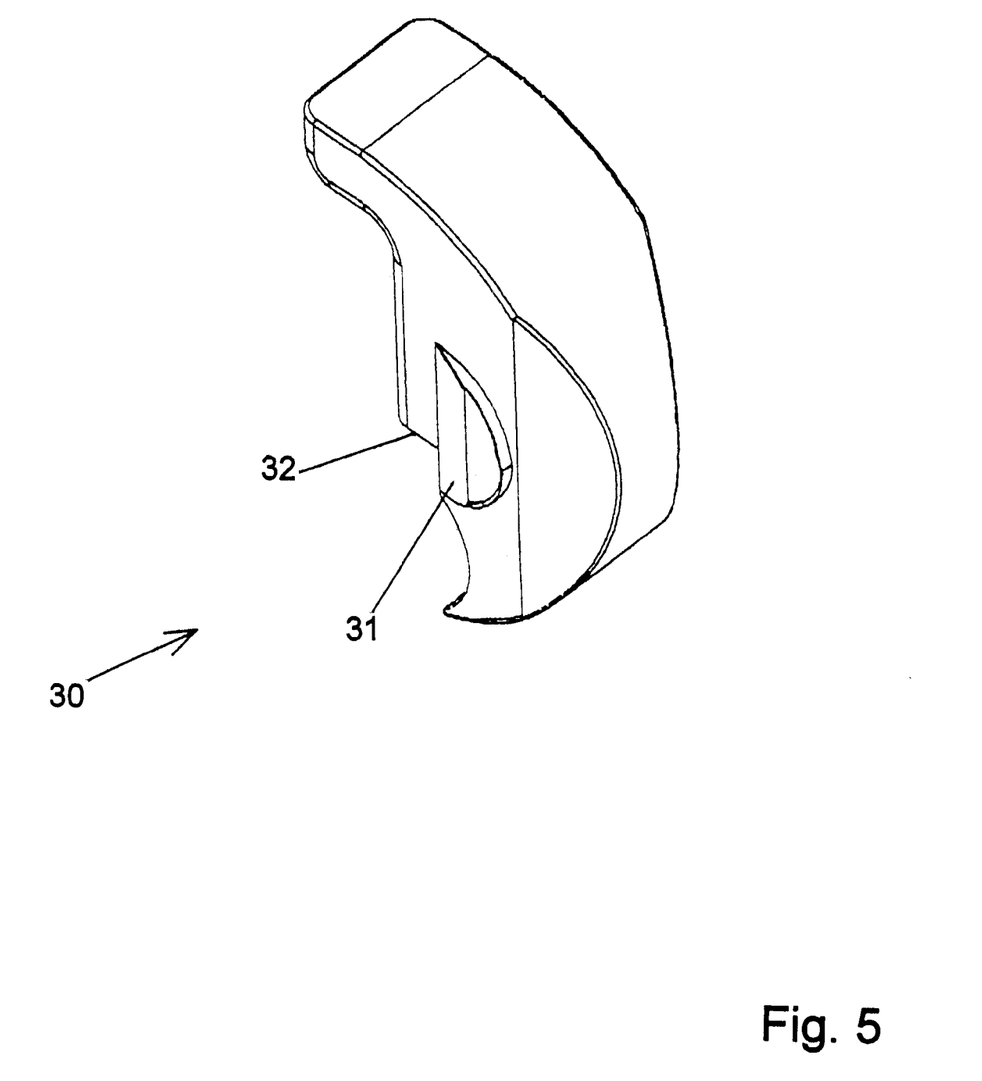
FIG. 5 is a schematic perspective view of a locking member.

FIG. 5 shows the locking member 30. The locking member 30 comprises laterally extending, spring-loaded parts 31 which, in mounted condition, can extend into the slotted hole 8C. Further, the locking member 30 comprises an edge 32 which, in mounted condition of the locking member 30, is accessible from the lateral side 28 of the conveyor mat 1, via the slotted hole 8C, for lifting the locking member 30. The spring action can, for instance, be obtained by choosing the recess 29 to be too narrow or by choosing the width of the locking member 30 to be too great. Preferably, the locking member 30 has its back 38 provided with a groove extending between the parts 31. The groove is not visible in the Figure.

Figure 6:
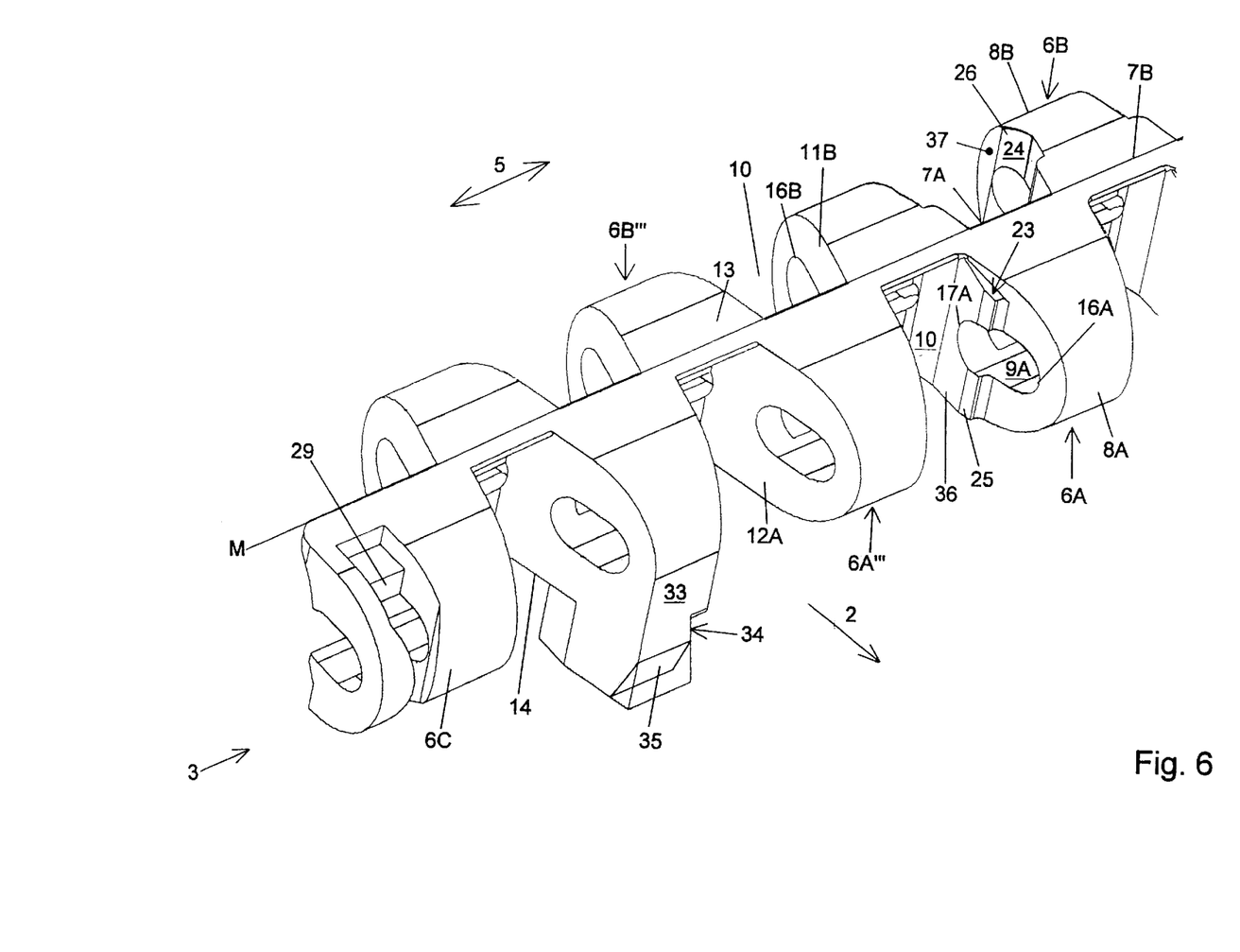
FIG. 6 is a schematic perspective view of a part of a module having a guide member.

FIG. 6 shows a part of a module 3 having a guide member 33 extending outwards from the bottom side 14, which guide member 33, at a lateral side 34 thereof, has a bevel transverse to the conveying direction. On the bottom side 14 of the part of the module 3 that is not shown, a second guide member is preferably provided. The facing sides 34 of the guide members extend outwards and are inclined towards each other so as to be wedge-shaped, and cooperate with a guide not shown. The faces of the guide members 33 which faces lead in conveying direction 2 may be provided with a bevel 35 extending in rearward direction.

It is observed that the invention is not limited to the preferred embodiment here discussed, but that many variants are possible.

For instance, a conveyor mat according to the invention may also be built up from a number of parallel rows of successive modules cooperating according to a brickstone pattern. Such conveyor mat may for instance be built up from five types of modules: one long symmetrical central module, one short left end module, one long left end module, one short right end module, and one long right end module. It is possible to construct a set of end modules with a closed-off end, i.e. without locking member. Further, it is possible to provide only the hinge loops of the central module with projections and grooves.

Also, the basic form of the hinge loops may be different, for instance semi-circular. Moreover, the conveyor belt may be built up from two types alternating in conveying direction, the even modules being on either side provided with hinge loops of the type discussed hereinabove as "forwardly extending", while the odd module are on either side provided with hinge loops of the type discussed hereinabove as "rearwardly extending".

It is also possible to provide a hinge loop with a projection on one lateral side thereof and with a recess on the other lateral side thereof.

These and other variants are within the framework of the invention as expressed in the claims.

What is claimed is:

1. A conveyor mat (1), comprising a number of plastic modules (3) succeeding each other in a conveying direction (2) and whose top sides (13) form a conveying face (4), said modules (3) each being provided, in a transverse direction (5) thereof, with a number of hinge loops (6) which have equal basic forms and which alternately extend forwards and rearwards relative to the conveying direction (2) and converge from a base (7) to a top (8), said hinge loops (6) being provided, adjacent the top (8) thereof, with slotted holes (9), said modules (3) each being further provided with a number of interspaces (10) formed to be at least partially complementary to the hinge loops (6) and at least partially bounded by the sidewalls (11A, 12A) of two hinge loops (6) extending in the same direction, the successive modules (3) of said conveyor mat (1) being coupled by means of hinge pins (15) extending through the slotted holes (9), such that the forwardly extending hinge loops (6A) of the rearmost module (3A) can slide between the rearwardly extending hinge loops (6B) of the next module (3B) between a slid-out position (I) in which the hinge pin (15) abuts against a top-proximal wall (17) of the slotted hole (9) and a slid-in position (II), and wherein at least one sidewall (11A, 12A) of at least one forwardly extending hinge loop (6A) is provided, between the base (7) thereof and the top-proximal wall (17) of the slotted hole (9), with a projection (23) which, in said slid-out position (I) cooperates with the top (8) of the adjacent, rearwardly extending hinge loop (6B), and wherein the sidewall (11A, 12A) of the adjacent hinge loop is provided with a recess (24) in which the projection (23) can be received during sliding into the slid-in position (II), characterized in that, at least in the slid-in position the hinge loops (6) at the location of the recesses (24) in the sidewalls (11B, 12B) and the projections (23) are free of overlapping parts, such that successive modules (3) can move through a bend in a plane substantially transverse to the conveying plane and extending in the conveying direction from or to the slid-in position (II).

2. A conveyor mat according to claim 1, wherein the module has a center (M) and wherein the slotted hole has opposite ends and a midpoint equidistant from the opposite ends and wherein the projection, viewed in a forward direction, is located between the center of the module and the midpoint of the slotted opening.

3. A conveyor mat (1) according to claim 1 or 2, wherein the projection (23) extends transversely to the conveying face (4), preferably to a position just below the conveying face (4).

4. A conveyor mat (1) according to claim 3, wherein the projection (23) is provided with a contact face (25) for cooperation with the top (8) of the adjacent hinge loop.

5. A conveyor mat (1) according to claim 1, wherein the recess is provided with a slid-in face (26) extending transversely to the conveying face (4), substantially parallel to the sidewall (11A, 12A) of the opposite hinge loop.

6. A conveyor mat (1) according to claim 1, wherein both sidewalls (11A, 12A) of a forwardly extending hinge loop (6A) are provided, between the base (7) and the top-proximal wall (17) of the slotted hole (9), with a projection (23) and that the sidewalls (11A, 12A) of the opposite, rearwardly extending hinge loops (6B) are each provided, adjacent the top (8), with a corresponding recess.

7. A conveyor mat (1) according to claim 1, wherein the hinge loops (6) located in a part located adjacent a lateral side of the conveyor mat (1) are provided with substantially flat sidewalls (11A, 12A).

8. A conveyor mat (1) according to claim 1, wherein in transverse direction (5) of the module, the hinge loops (6C) bounding a lateral side of the conveyor mat (1) have a greater width than the other hinge loops (6).

9. A conveyor mat (1) according to claim 1, wherein the hinge loops ($6C^1$) bounding a lateral side of the conveyor mat (1) are provided, adjacent the top (8), with a recess extending substantially transversely to the conveying direction (2) and intersecting the slotted hole (9).

10. A conveyor mat (1) according to claim 1, wherein a number of modules (3) each have their bottom sides provided with an outwardly extending guide member (33) for cooperating with a guide mounted on a conveying path, said guide member (33) being provided, on a lateral side (34) thereof, with a face beveled transversely to the conveying direction (2).

11. A conveyor mat (1) according to claim 1, wherein a number of modules (3) each have their bottom sides provided with an outwardly extending guide member (33) for cooperating with a guide mounted on a conveying path, and that in conveying direction (2) the foremost and/or rearmost face (34) of the guide member is provided with a bevel (35), extending in rearward or forward direction respectively.

12. A conveyor mat (1) according to claim 1, wherein the hinge loops ($6A^{III}$, $6B^{III}$) located in a part adjacent a lateral side of the conveyor mat (1) are provided with substantially flat sidewalls (11B, 12B).

13. A module for a conveyor mat (1) according to claim 1, having a top side (13) for forming a conveying face (4) and being provided, in a transverse direction (5) thereof, with a number of hinge loops (6) which have equal basic forms and which alternately extend forwards and rearwards relative to a conveying direction (2) and converge from a base (7) to a top (8), said hinge loops (6) being provided, adjacent the top thereof, with slotted holes (9), said module (3) being further provided with a number of interspaces (10) formed to be at least partially complementary to the hinge loops (6) and at least partially bounded by the sidewalls (11A, 12A) of two hinge loops (6) extending in the same direction, in which module (3) at least one sidewall (11A, 12A) of at least one forwardly extending hinge loop (6A) is provided, between the base (7) thereof and the top-proximal wall (17) of the slotted hole (9), with a projection (23), and wherein the sidewall (11A, 12) of at least one rearwardly extending hinge loop (6B) is provided with a recess (24), wherein the hinge loops (6) at the location of the recesses (24) are provided with a slide-in face (26) extending transversely to the conveying face (4), substantially parallel to the sidewall (11A, 12A) of the opposite hinge loop (6A).

* * * * *